US012764846B2

(12) United States Patent
Meerbeek et al.

(10) Patent No.: US 12,764,846 B2
(45) Date of Patent: Oct. 13, 2026

(54) DETERMINING GLOBAL AND LOCAL LIGHT EFFECT PARAMETER VALUES

(71) Applicant: SIGNIFY HOLDING B.V., Eindhoven (NL)

(72) Inventors: Berent Willem Meerbeek, Veldhoven (NL); Tobias Borra, Rijswijk (NL); Dzmitry Viktorovich Aliakseyeu, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 18/833,953

(22) PCT Filed: Jan. 26, 2023

(86) PCT No.: PCT/EP2023/051927
§ 371 (c)(1),
(2) Date: Jul. 29, 2024

(87) PCT Pub. No.: WO2023/144269
PCT Pub. Date: Aug. 3, 2023

(65) Prior Publication Data

US 2025/0168953 A1 May 22, 2025

(30) Foreign Application Priority Data

Jan. 31, 2022 (EP) .................................... 22154199

(51) Int. Cl.
*H05B 47/165* (2020.01)
*H05B 47/135* (2020.01)
(Continued)

(52) U.S. Cl.
CPC ......... *H05B 47/165* (2020.01); *H05B 47/135* (2020.01); *H05B 47/155* (2020.01);
(Continued)

(58) Field of Classification Search
CPC .... H05B 45/20; H05B 47/135; H05B 47/155; H05B 47/16; H05B 47/165; H05B 47/19; H05B 47/1965; H05B 47/1985
See application file for complete search history.

(56) References Cited

U.S. PATENT DOCUMENTS

2010/0071535 A1* 3/2010 McKinney ........... H05B 47/155
84/464 R
2018/0302970 A1 10/2018 Chen et al.
(Continued)

FOREIGN PATENT DOCUMENTS

EP 3839766 A1 6/2021
WO WO-2019026236 A1 * 2/2019 .............. G10G 3/04

OTHER PUBLICATIONS

Machine Translation WO2019026236A1 (Year: 2019).*

*Primary Examiner* — Raymond R Chai

(57) ABSTRACT

A system is configured to select a first subset (11) and a second subset (13) from a plurality of lighting devices (11,13) based on a type of each of the lighting devices, obtain first audio characteristics of the audio content, obtain, based on the types of the lighting devices in the second subset, second audio characteristics of the audio content, determine first light effect parameter values (75,76,83,88, 95,96) based on the first audio characteristics, determine second light effect parameter values (72,92) based on the second audio characteristics, determine first light effects (78,98) with the first light effect parameter values, determine second light effects (79,99) with the first light effect parameter values and the second light effect parameter values, and control the first subset to render the first light effects and the second subset to render the second light effects while the audio rendering system renders the audio content.

17 Claims, 5 Drawing Sheets

(51) Int. Cl.

| | |
|---|---|
| ***H05B 47/155*** | (2020.01) |
| ***H05B 47/16*** | (2020.01) |
| ***H05B 47/175*** | (2020.01) |
| ***H05B 47/19*** | (2020.01) |

(52) U.S. Cl.

CPC ............. *H05B 47/16* (2020.01); *H05B 47/19* (2020.01); *H05B 47/1965* (2024.01); *H05B 47/1985* (2024.01)

(56) References Cited

U.S. PATENT DOCUMENTS

| | | | | |
|---|---|---|---|---|
| 2018/0368230 | A1 | 12/2018 | Chen et al. | |
| 2019/0088285 | A1 | 3/2019 | Kawano et al. | |
| 2019/0230772 | A1* | 7/2019 | Reiss ..................... | H05B 45/20 |
| 2020/0225751 | A1* | 7/2020 | Kim ....................... | H05B 47/19 |
| 2021/0195716 | A1 | 6/2021 | Rasmussen et al. | |
| 2022/0159809 | A1* | 5/2022 | Kim ....................... | H05B 47/19 |
| 2023/0247744 | A1* | 8/2023 | Tellatin ................ | H05B 47/115 315/76 |
| 2025/0168953 | A1* | 5/2025 | Meerbeek .............. | H05B 47/16 |

* cited by examiner

DETERMINING GLOBAL AND LOCAL LIGHT EFFECT PARAMETER VALUES

CROSS-REFERENCE TO PRIOR APPLICATIONS

This application is the U.S. National Phase application under 35 U.S.C. § 371 of International Application No. PCT/EP2023/051927, filed on Jan. 26, 2023, which claims the benefit of European Patent Application No. 22154199.8, filed on Jan. 31, 2022. These applications are hereby incorporated by reference herein.

FIELD OF THE INVENTION

The invention relates to a system for controlling a plurality of lighting devices to render light effects while an audio rendering system renders audio content.

The invention further relates to a method of controlling a plurality of lighting devices to render light effects while an audio rendering system renders audio content.

The invention also relates to a computer program product enabling a computer system to perform such a method.

BACKGROUND OF THE INVENTION

To create a more immersive experience for a user who is listening to a song being played by an audio rendering device, a lighting device can be controlled to render light effects while the audio rendering device plays the song. In this way, the user can create an experience at home which somewhat resembles the experience of a club or concert, at least in terms of lighting. To create an immersive light experience, the accompanying light effects should match the music in terms of e.g. color, intensity, and/or dynamics (i.e. the number of events in a particular time period). The light effects may be synchronized to the bars and/or beats of the music or even to the rhythm of the music, for example.

US 2018/0368230 A1 discloses a light control system which comprises a power connecting port, a host connecting port, a first light connecting port, a second light connecting port, a microcontroller and a power distribution unit. The microcontroller is configured to identify device types and generate two dimming signals according to configurations corresponding to the device types and the multimedia signal. The power distribution unit converts the two dimming signals to two driving signals for controlling the first light device and the second light device to emit colored lights associated with the multimedia signals.

US 2018/0302970 A1 discloses a method which comprises grouping a plurality of lamps according to the state of each of the plurality of lamps, selecting at least one group of lamps, selecting music as a background music, playing the background music, obtaining a current scale, and controlling the selected at least one group of lamps to emit a corresponding color according to the current scale.

To create a compelling music listening experience with light, it is important how the light effects are rendered on the lighting devices in the room. In current solutions, the light effects appear rather chaotic and not orchestrated when rendered on all lighting devices, leading to a suboptimal experience. With the introduction of gradient/pixelated lighting devices, the devices can render even more different colors at the same time. When executed poorly, this can lead to a 'cacophony' of colors and intensities.

SUMMARY OF THE INVENTION

It is a first object of the invention to provide a system, which is able to help create a music listening experience with light in which the light effects do not appear chaotic.

It is a second object of the invention to provide a method, which can be used to help create a music listening experience with light in which the light effects do not appear chaotic.

In a first aspect of the invention, a system for controlling a plurality of lighting devices to render light effects while an audio rendering system renders audio content comprises at least one transmitter and at least one processor configured to select a first subset and a second subset from said plurality of lighting devices based on a type of each of said plurality of lighting devices, said second subset being different from said first subset, obtain one or more first audio characteristics of said audio content, and obtain, based on said one or more types of said lighting devices in said second subset, one or more second audio characteristics of said audio content, said one or more second audio characteristics being different from said one or more first audio characteristics.

The at least one processor is further configured to determine a first set of light effect parameter values based on said one or more first audio characteristics, determine a second set of light effect parameter values based on said one or more second audio characteristics, determine first light effects with said first set of light effect parameter values, determine second light effects with said first set of light effect parameter values and said second set of light effect parameter values, control, via said at least one transmitter, said first subset of lighting devices to render said first light effects while said audio rendering system renders said audio content, and control, via said at least one transmitter, said second subset of lighting devices to render said second light effects while said audio rendering system renders said audio content.

In this way, it is possible to control all lighting devices of the plurality of lighting devices to render light effects with global light effect parameter values and control a subset of the plurality of lighting devices to render light effects with local light effect parameter values. The local light effect parameter values make it possible to take advantage of advanced capabilities of lighting devices, e.g. pixelated lighting devices, even if other lighting devices do not have these advanced capabilities. The global light effect parameter values ensure that the rendered light effects do no lead to a 'cacophony' of colors and/or intensities, but to a richer and more sophisticated light experience.

Thus, in a music-light sync application, certain audio features (e.g. loudness) are associated with certain control parameters (e.g. brightness) and are mapped onto any lighting device, while others (e.g. pitch, timbre) are associated with other control parameters (e.g. movement, color) and are only mapped onto certain types of lighting devices. A first light effect parameter value may be part of a second parameter value, e.g. a color specified in a command transmitted to a single pixel lighting device may be part of a plurality of colors specified in a command transmitted to a multi pixel lighting device. On the other hand, the first light effects are not determined with the second light effect parameter values, as the lighting devices in the first subset of lighting devices are not capable of rendering light effects with the second light effect parameter values.

Said type of each of said plurality of lighting devices may comprise, for example, one or more of: floor standing, table, ceiling, light strip, spot, wall-mount, white with fixed color temperature, tunable white, color, single pixel, and multi pixel. Said at least one processor may be configured to obtain said one or more first audio characteristics and said one or more second audio characteristics by receiving metadata describing at least some of said one or more first audio characteristics and said one or more second audio characteristics and/or to receive said audio content and analyze said audio content to determine at least some of said one or more first audio characteristics and said one or more second audio characteristics.

Said at least one processor may be configured to determine events in said audio content based on said one or more first audio characteristics, said one or more second audio characteristics, and/or one or more further audio characteristics of said audio content, said events corresponding to moments in said audio content when said audio characteristics meet predefined requirements, and determine said first light effects and said second light effects for said events. These audio events are the moments in the audio content for which it is beneficial to render an accompanying light effect. The predefined requirements express when it is beneficial to render an accompanying light effect. The predefined requirements may require that the audio intensity/loudness exceeds a certain threshold, for example. In this case, the determined audio events are the moments at which the audio intensity/loudness exceeds the threshold. These audio events may be determined based on data points received from a music streaming service, for example.

Said at least one processor may be configured to obtain location information indicative of locations of said plurality of lighting devices, determine one or more audio source positions associated with an event of said events, select one or more first lighting devices from said first subset based on said one or more audio source positions and said locations of said lighting devices of said first subset, select one or more second lighting devices from said second subset based on said one or more audio source positions and said locations of said lighting devices of said second subset, control said one or more first lighting devices to render a first light effect of said first light effects and said one or more second lighting devices to render a second light effect of said second light effects, said first light effect and said second light effect being determined for said event. This is beneficial for surround lighting. For example, if the audio content specifies that a certain instrument is rendered (predominantly) on a left surround speaker, a better light experience may be obtained by rendering the corresponding light effect on lighting devices near the left surround speaker.

Said one or more first audio characteristics may comprise one or more of loudness and energy and/or said first set of light effect parameter values comprises brightness values. Brightness values can normally be set/adjusted on all lighting devices and are therefore suitable as global light parameter values. Brightness values determined based on loudness and/or energy often provide a nice music-light experience.

Said one or more second audio characteristics may comprise a dynamicity level of said audio content and/or a genre of said audio content, said second subset of said plurality of lighting devices may comprise only multi pixel lighting devices, and said at least one processor may be configured to determine a plurality of colors to be rendered on said multi pixel lighting devices based on said dynamicity level and/or said genre and include in said second set of light effect parameter values one or more parameter values indicative of said plurality of colors.

The plurality of colors may be selected from a user-specified color palette or from a color palette that has been automatically determined based on album art, for example. For instance, which colors are selected from the color palette and/or the quantity of anchor colors to be rendered simultaneously on a pixelated lighting device may be determined based on the dynamicity level and/or the genre. Other colors rendered on the pixelated lighting device may then be interpolated from the anchor colors. For example, less anchor colors may be used for a classical song than for a pop song and the color difference between selected colors may be smaller for a classical song than for a pop song.

Said one or more first audio characteristics and/or said one or more second audio characteristics may comprise at least one of valence, key, timbre, and pitch and said at least one processor may be configured to determine a color, a color temperature, or a color palette based on said valence, said key, said timbre, and/or said pitch and include in said first set and/or said second set of light effect parameter values one or more parameter values indicative of said color, said color temperature, or one or more colors selected from said color palette. Whether these light effect parameter values, if supported, are included in the first set or the second of light parameter values typically depends on whether all lighting devices support color (temperature) or not.

Said one or more first audio characteristics may comprise a duration of a beat in said audio content and said at least one processor may be configured to determine, based on said duration of said beat, a duration of a light effect to be rendered during said beat, said duration of said light effect being one of said first set of light effect parameter values. The moment and duration of a light effect can normally be controlled on all lighting devices and duration is therefore suitable as a global light parameter value.

Said one or more first audio characteristics may comprise tempo and said at least processor may be configured to determine a speed of transitions between light effects based on said tempo, one or more parameter values of said first set of light effect parameter values being indicative of said speed of transitions between light effects. The speed of transitions between light effects can normally be set/adjusted on all lighting devices and parameter values indicative of this speed are therefore suitable as global light parameter values.

Said at least one processor may be configured to select a third subset from said plurality of lighting devices based on said type of each of said plurality of lighting devices, said third subset being different from said first subset, obtain, based on said one or more types of said lighting devices in said third subset, one or more third audio characteristics of said audio content, said one or more third audio characteristics being different from said one or more first audio characteristics and said one or more second audio characteristics, determine a third set of light effect parameter values based on said one or more third audio characteristics, determine third light effects with said first set of light effect parameter values and said third set of light effect parameter values, control, via said at least one transmitter, said third subset of lighting devices to render said third light effects while said audio rendering system renders said audio content.

Said second subset and said third subset are typically different but may have certain common properties. For instance, the second subset may comprise pixelated light strips and the third subset may comprise pixelated light panels. More than two subsets may be supported.

In a second aspect of the invention, a method of controlling a plurality of lighting devices to render light effects while an audio rendering system renders audio content comprises selecting a first subset and a second subset from said plurality of lighting devices based on a type of each of said plurality of lighting devices, said second subset being different from said first subset, obtaining one or more first audio characteristics of said audio content, and obtaining, based on said one or more types of said lighting devices in said second subset, one or more second audio characteristics of said audio content, said one or more second audio characteristics being different from said one or more first audio characteristics.

Said method further comprises determining a first set of light effect parameter values based on said one or more first audio characteristics, determining a second set of light effect parameter values based on said one or more second audio characteristics, determining first light effects with said first set of light effect parameter values, determining second light effects with said first set of light effect parameter values and said second set of light effect parameter values, controlling said first subset of lighting devices to render said first light effects while said audio rendering system renders said audio content, and controlling said second subset of lighting devices to render said second light effects while said audio rendering system renders said audio content. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for controlling a plurality of lighting devices to render light effects while an audio rendering system renders audio content.

The executable operations comprise selecting a first subset and a second subset from said plurality of lighting devices based on a type of each of said plurality of lighting devices, said second subset being different from said first subset, obtaining one or more first audio characteristics of said audio content, and obtaining, based on said one or more types of said lighting devices in said second subset, one or more second audio characteristics of said audio content, said one or more second audio characteristics being different from said one or more first audio characteristics.

The executable operations further comprise determining a first set of light effect parameter values based on said one or more first audio characteristics, determining a second set of light effect parameter values based on said one or more second audio characteristics, determining first light effects with said first set of light effect parameter values, determining second light effects with said first set of light effect parameter values and said second set of light effect parameter values, controlling said first subset of lighting devices to render said first light effects while said audio rendering system renders said audio content, and controlling said second subset of lighting devices to render said second light effects while said audio rendering system renders said audio content.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
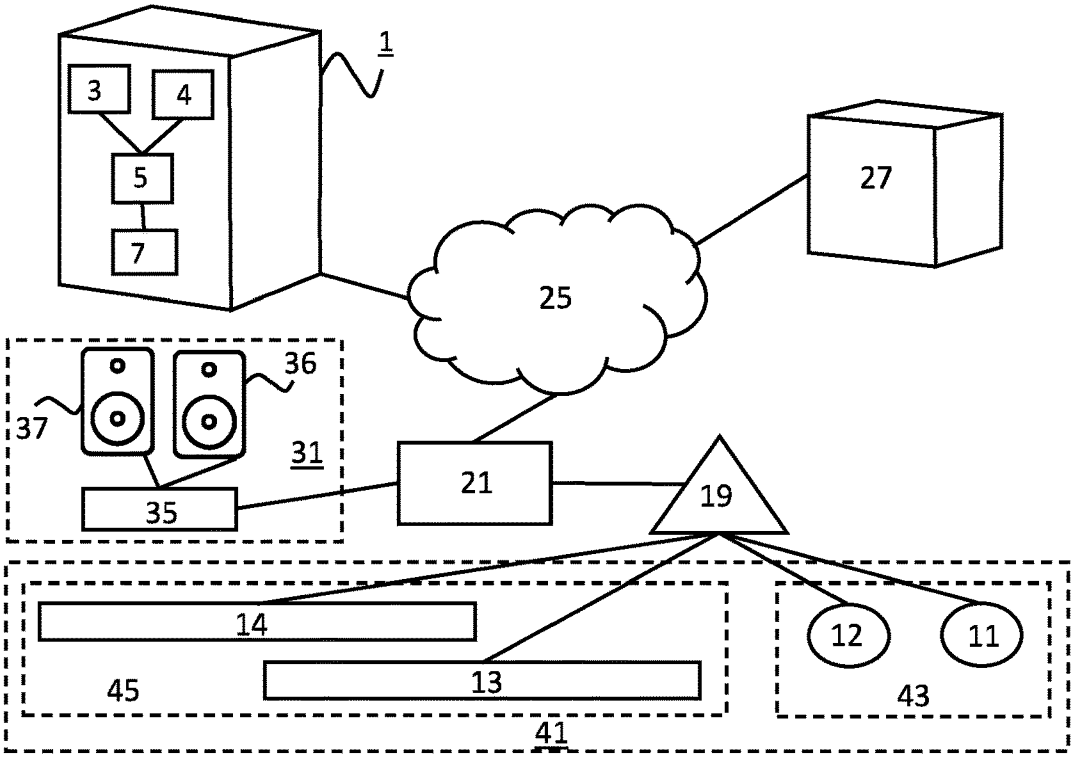
FIG. 1 is a block diagram of a first embodiment of the system.

FIG. 1 shows a first embodiment of the system for controlling a plurality of lighting devices to render light effects while an audio rendering system 31 renders audio content. In this first embodiment, the system is a computer 1. The computer 1 is connected to the Internet 25 and acts as a server. The computer 1 may be operated by a lighting company, for example. In the example of FIG. 1, the audio rendering system 31 comprises an A/V receiver 35 and two speakers 36 and 37. A music streaming service 27 is also connected to the Internet 25.

In the embodiment of FIG. 1, the computer 1 is able to control lighting devices 11-14 via a wireless LAN access point 21 and a bridge 19. In the example of FIG. 1, the plurality of lighting devices 41 comprises single-pixel color lighting devices 11 and 12 and multi-pixel (i.e. pixelated) color lighting devices 13 and 14, e.g. light strips. The wireless LAN access point 21 is also connected to the Internet 25. The bridge 19 may be a Hue bridge, for example. The bridge 19 communicates with lighting devices 11-14, e.g., using Zigbee technology. The bridge 19 and the A/V receiver 35 are connected to the wireless LAN access point 21, e.g., via Wi-Fi or Ethernet.

The computer 1 comprises a receiver 3, a transmitter 4, a processor 5, and storage means 7. The processor 5 is configured to select a first subset and a second subset from the plurality of lighting devices 41 based on a type of each of the plurality of lighting devices 41, obtain one or more first audio characteristics of the audio content, and obtain, based on the one or more types of the lighting devices in the second subset, one or more second audio characteristics of the audio content. The one or more second audio characteristics are different from the one or more first audio characteristics.

The second subset of lighting devices is different from the first subset of lighting devices. In the example of FIG. 1, the plurality of lighting devices 41 comprises a first subset 43 which comprises single-pixel color lighting devices 11 and 12 and a second subset 45 which comprises multi-pixel color lighting devices 13 and 14.

The processor 5 is further configured to determine a first set of light effect parameter values based on the one or more first audio characteristics, determine a second set of light effect parameter values based on the one or more second audio characteristics, determine first light effects with the first set of light effect parameter values, and determine second light effects with the first set of light effect parameter values and the second set of light effect parameter values. In this description, the first set of light effect parameter values are also referred as global light effect parameter values and the second set of light effect parameter values are also referred to as local light effect parameter values.

The processor 5 is further configured to control, via transmitter 4, the first subset 43 of lighting devices to render the first light effects while the audio rendering system 31 renders the audio content, and control, via the transmitter 4, the second subset 45 of lighting devices to render the second light effects while the audio rendering system 31 renders the audio content. By mapping the first set of light effect parameter values to all of the plurality of lighting devices (e.g. all lighting devices in a room) and the second set of light effect parameter values to a subset of the plurality of lighting devices, background/global effects (e.g. on room level) and foreground/local effects (subset level) are created.

In the embodiment of FIG. 1, the processor 5 is configured to create a light script on the fly in the cloud and then stream it to the bridge 19. The light script may be created based on the following inputs: (1) audio characteristics, e.g. song audio properties captured as metadata; (2) light setup including number of lights and presence of pixelated light sources; and (3) user set parameters—e.g. color palette and dynamicity level (alternatively both palette and dynamic level could be set automatically).

The processor 5 may be configured to obtain the one or more first audio characteristics and the one or more second audio characteristics by receiving from the music streaming service 27 metadata describing at least some of the one or more first audio characteristics and the one or more second audio characteristics. Alternatively, the processor 5 may be configured to receive the audio content from the music streaming service 27 and analyze the audio content to determine at least some of the one or more first audio characteristics and the one or more second audio characteristics.

The one or more first audio characteristics may comprise loudness and/or energy, for example. The first set of light effect parameter values may in this case comprise brightness values determined based on loudness (e.g. maximum loudness of a segment or a difference in loudness between the start and end of a segment) and/or energy, for example.

The one or more first audio characteristics may comprise a duration of a beat in the audio content. In this case, the processor 5 may be configured to determine, based on the duration of the beat, a duration of a light effect to be rendered during the beat and the duration of the light effect may then be one of the first set of light effect parameter values, for example. Thus, the beat information may be used to generate a dedicated light effect at the moment of the beat (e.g. pulse, brightness flash) and for the duration of the beat.

The one or more first audio characteristics may comprises tempo. In this case, the processor 5 may be configured to determine a speed of transitions between light effects based on the tempo and one or more parameter values of the first set of light effect parameter values may be indicative of the speed of transitions between light effects, for example.

In the example of FIG. 1, all lighting devices are able to render colors. In this case, the one or more first audio characteristics may comprise one or more of valence, key, timbre, and pitch, and the processor 5 may be configured to determine a color based on the valence, the key, the timbre, and/or the pitch and include in the first set of light effect parameter values one or more parameter values indicative of the color.

If not all lighting devices would be able to render colors, the one or more second audio characteristics may comprise one or more of valence, key, timbre, and pitch, and the processor 5 may be configured to determine a color (e.g. if all lighting devices of the second subset would be color lighting devices) or a color palette (e.g. if all lighting devices would be multi-pixel color lighting devices) based on the valence, the key, the timbre, and/or the pitch and include in the second set of light effect parameter values one or more parameter values indicative of the color or one or more colors selected from the color palette.

Alternatively, the color may be determined based on the genre of the audio content. Instead or in addition to the color, a level of dynamicity may be determined based on the genre and/or one or more of valence, key, timbre, and pitch. For example smooth jazz may be mapped to (light effects with) a low level of dynamicity and happy hardcore may be mapped to (light effects with) a high level of dynamicity. Furthermore, danceability audio characteristics may be mapped to a level of dynamicity. For example, a high danceability may be mapped to a high level of dynamicity. Level of dynamicity is normally a global light effect parameter.

As an example of a global light effect parameter, brightness may be determined based on maximum loudness (of a segment) and/or loudness difference (e.g. difference between loudness_start and loudness_end of a segment). If all lighting devices are able to render color, then a main color may be used as global light effect parameter. Alternatively, the (main) color may be used as local light effect parameter for single pixel lighting devices.

First, a color palette may be determined based on the valency, or energy, or key of the audio content, for example. Alternatively, the color palette may be user-defined or determined automatically based on album art, for example. The main color to be used as light effect parameter value may be randomly selected from the color palette, for example. For each light effect, a different main color may be selected from the color palette. For multi pixel lighting devices, multiple colors to be rendered at the same time may be selected from the color palette.

As an example of a local light effect parameter for multi pixel lighting devices, the pitch, the timbre, or the "liveness" of the audio content may be used to determine how exactly colors are distributed over the pixels of the multi pixel lighting devices. For example, an initial color palette that has been defined by a user or determined based on album art may be adjusted based on an audio characteristic and used as local light effect parameter for multi pixel lighting devices.

If not all lighting devices are able to render color, brightness might be the only global light effect parameter. In this case, a (main) color may be selected from a color palette as local light effect parameter value for single pixel color lighting devices and multiple colors may be selected from the color palette as local light effect parameter value for multi pixel color lighting devices.

Example of Spotify audio characteristics on a song level:

```
{
"danceability" : 0.569,
"energy" : 0.913,
"key" : 8,
"loudness" : −6.973,
"mode" : 1,
"speechiness" : 0.0638,
"acousticness" : 0.00618,
"instrumentalness" : 0.834,
"liveness" : 0.287,
"valence" : 0.504,
"tempo" : 137.822,
"type" : "audio_features",
"duration_ms" : 259200,
"time_signature" : 4
}
```

Example of time based data point from Spotify metadata for a single segment, usually around 200-1000 milliseconds in length:

{
"start":0.62113,"duration":0.45302,"confidence":1.0,"loudness_start":–60.0,"loudness_max_time":0.03053,"loudness_max":–3.741,"loudness_end":0.0,"pitches":[0.527,0.891,1.0,0.414,0.495,0.229,0.299,0.214,0.693,0.644,0.546,0.265],"timbre":[52.574,100.926,–28.888,–6.8,–13.993,12.031,17.84,48.33,–23.331,–12.727,26.336,9.114]
}

It may also be possible to render more complex light effects on multi pixel lighting devices. For example, a ripple effect may be activated during a very specific song section transition (e.g. when at the end of the song it turns from very energizing to a very slow final piece). When a ripple effect is to be rendered, single pixel lighting devices may be controlled to render a standard color and brightness change, but the multi pixel lighting devices may be controlled to add movement to the standard color and brightness change. Another example of a more complex light effect is a chasing/running light effect.

In the embodiment of FIG. 1, the mapping of global and local light parameter values for audio content is performed in the cloud and the result is captured in a light script which contains all light control commands that need to be send over time for the duration of the song. This script is sent to the bridge 19 which plays the script in sync with the music that is being played.

In the embodiment of the computer 1 shown in FIG. 1, the computer 1 comprises one processor 5. In an alternative embodiment, the computer 1 comprises multiple processors. The processor 5 of the computer 1 may be a general-purpose processor, e.g., from Intel or AMD, or an application-specific processor. The processor 5 of the computer 1 may run a Windows or Unix-based operating system for example. The storage means 7 may comprise one or more memory units. The storage means 7 may comprise one or more hard disks and/or solid-state memory, for example. The storage means 7 may be used to store an operating system, applications and application data, for example.

The receiver 3 and the transmitter 4 may use one or more wired and/or wireless communication technologies such as Ethernet and/or Wi-Fi (IEEE 802.11) to communicate with the Internet 25, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The computer 1 may comprise other components typical for a computer such as a power connector. The invention may be implemented using a computer program running on one or more processors.

In the embodiment of FIG. 1, the computer 1 transmits data to the lighting devices 11-14 via the bridge 19. In an alternative embodiment, the computer 1 transmits data to the lighting devices 11-14 without a bridge.

Figure 2:
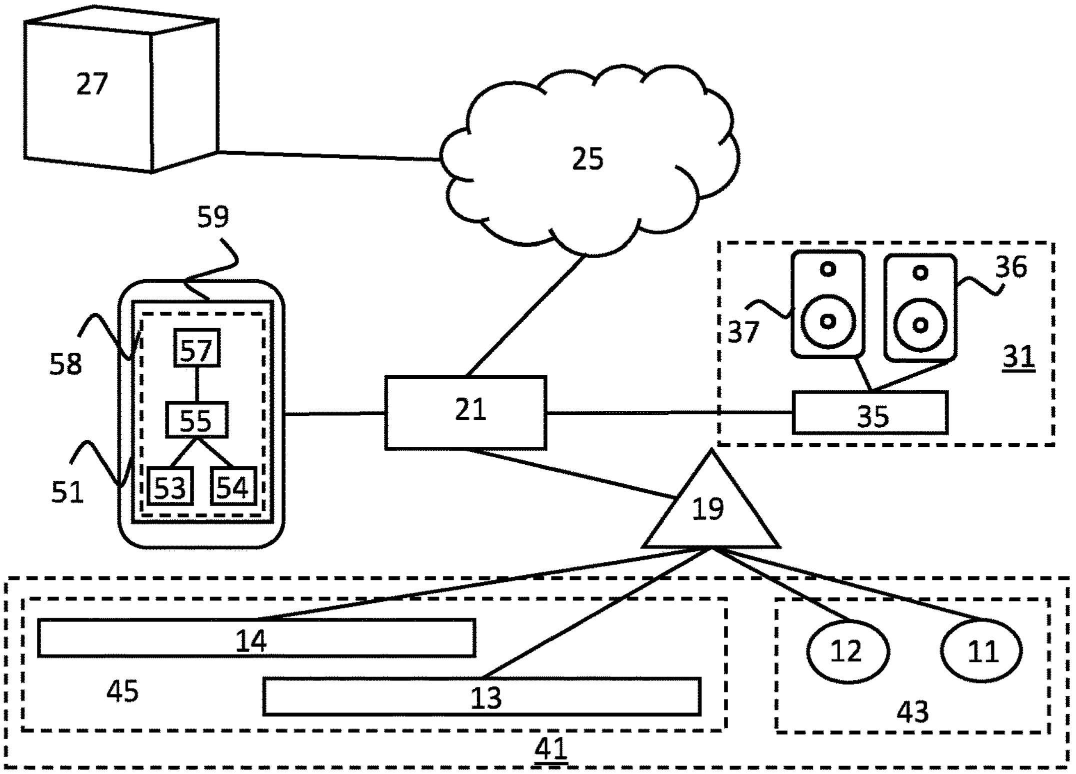
FIG. 2 is a block diagram of a second embodiment of the system.

FIG. 2 shows a second embodiment of the system or controlling one or more lighting devices to render light effects while an audio rendering system 41 renders audio content. In this second embodiment, the system is a mobile device 51. The mobile device 51 may be a smart phone or a tablet, for example. The lighting devices 11-14 can be controlled by the mobile device 51 via the bridge 19. The mobile device 51 is connected to the wireless LAN access point 21, e.g., via Wi-Fi.

The mobile device 51 comprises a receiver 53 a transmitter 54, a processor 55, a memory 57, and a touchscreen display 59. The processor 55 is configured to select a first subset and a second subset from the plurality of lighting devices 41 based on a type of each of the plurality of lighting devices 41, obtain one or more first audio characteristics of the audio content, and obtain, based on the one or more types of the lighting devices in the second subset, one or more second audio characteristics of the audio content. The one or more second audio characteristics are different from the one or more first audio characteristics.

The second subset of lighting devices is different from the first subset of lighting devices. In the example of FIG. 1, the plurality of lighting devices 41 comprises a first subset 43 which comprises single-pixel color lighting devices 11 and 12 and a second subset 45 which comprises multi-pixel (i.e. pixelated) color lighting devices 13 and 14.

The processor 55 is further configured to determine a first set of light effect parameter values based on the one or more first audio characteristics, determine a second set of light effect parameter values based on the one or more second audio characteristics, determine first light effects with the first set of light effect parameter values, and determine second light effects with the first set of light effect parameter values and the second set of light effect parameter values.

The processor 55 is further configured to control, via transmitter 54, the first subset 43 of lighting devices to render the first light effects while the audio rendering system 31 renders the audio content, and control, via the transmitter 54, the second subset 45 of lighting devices to render the second light effects while the audio rendering system 31 renders the audio content.

In the embodiment of the mobile device 51 shown in FIG. 2, the mobile device 51 comprises one processor 55. In an alternative embodiment, the mobile device 51 comprises multiple processors. The processor 55 of the mobile device 51 may be a general-purpose processor, e.g., from ARM or Qualcomm or an application-specific processor. The processor 55 of the mobile device 51 may run an Android or iOS operating system for example. The display 59 may comprise an LCD or OLED display panel, for example. The memory 57 may comprise one or more memory units. The memory 57 may comprise solid state memory, for example.

The receiver 53 and the transmitter 54 may use one or more wireless communication technologies such as Wi-Fi (IEEE 802.11) to communicate with the wireless LAN access point 21, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 53 and the transmitter 54 are combined into a transceiver. The mobile device 51 may further comprise a camera (not shown). This camera may comprise a CMOS or CCD sensor, for example. The mobile device 51 may comprise other components typical for a mobile device such as a battery and a power connector. The invention may be implemented using a computer program running on one or more processors.

In the embodiment of FIG. 2, lighting devices 11-14 are controlled via the bridge 19. In an alternative embodiment, one or more of lighting devices 11-14 are controlled without a bridge, e.g., directly via Bluetooth. Mobile device 51 may be connected to the Internet 25 via a mobile communication network, e.g., 5G, instead of via the wireless LAN access point 21.

Figure 3:
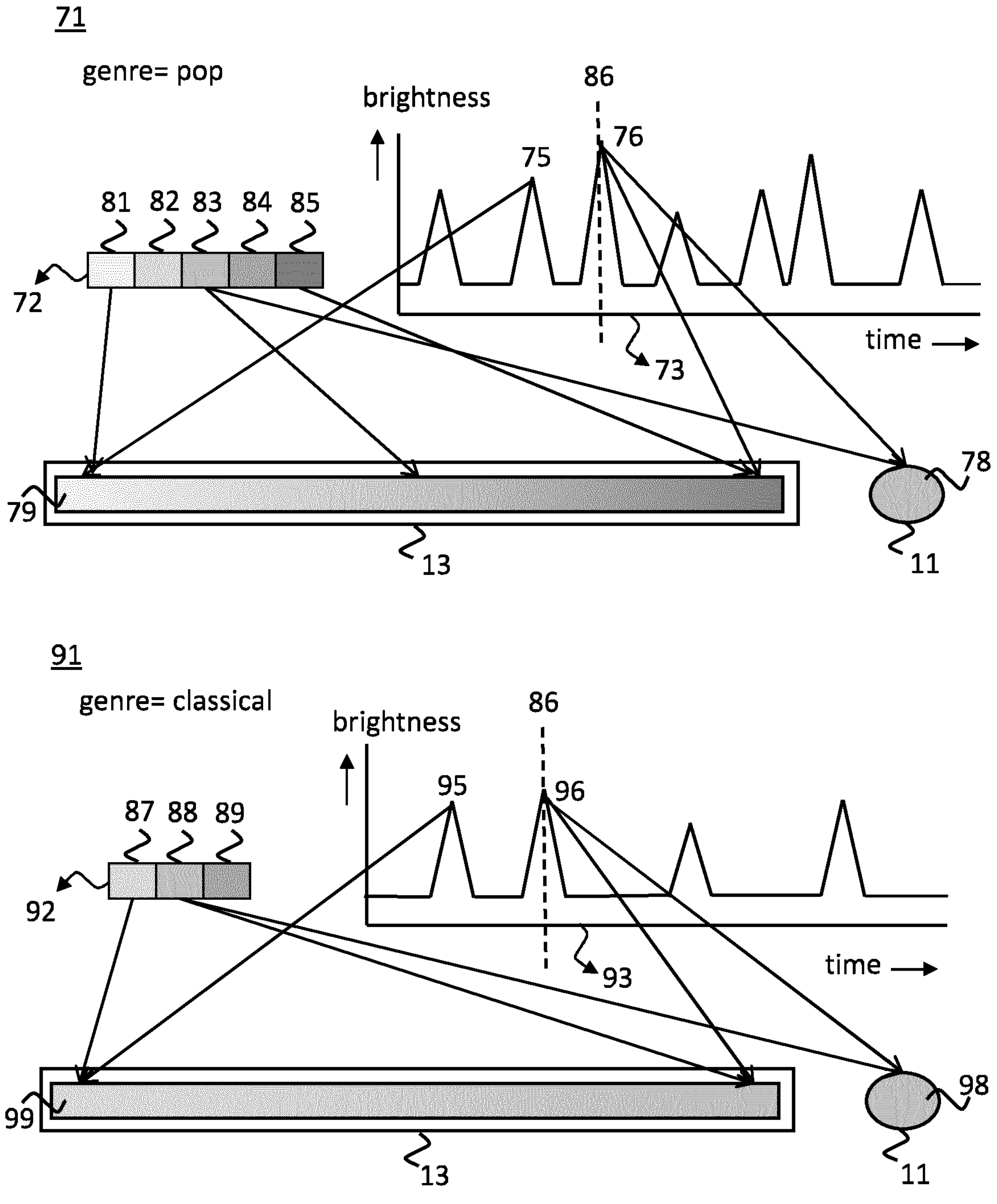
FIG. 3 shows examples of first and second light effect parameter values determined based on audio characteristics.

FIG. 3 shows examples of first and second light effect parameter values determined based on audio characteristics. Light effect parameter values are shown for a first song 71 and for a second song 91. The genre of song 71 is pop and the genre of song 91 is classical. FIG. 3 shows light effects determined for single pixel color lighting device 11 and light effects determined for a multi pixel color lighting device 13. Single pixel color lighting device 11 renders a light effect 78 for song 71 and a light effect 98 for song 91. Multi pixel color lighting device 13 renders a light effect 79 for song 71 and a light effect 99 for song 91.

In the example of FIG. 3, brightness is a global light effect parameter. The brightness is determined based on the loudness and/or energy of the audio content. Graph 73 shows brightness over time for a certain period of song 71. In the period shown in graph 73, the song 71 has seven events. At the current moment 86 in song 71, an event occurs for which a brightness value 76 is determined based on the loudness. For the previous event, a brightness value 75 was determined based on the loudness.

Graph 93 shows brightness over time for a certain period of song 91. In the period shown in graph 93, the song 91 has four events. At the current moment 86 in song 91, an event occurs for which a brightness value 96 is determined based on the loudness. For the previous event, a brightness value 95 was determined based on the loudness. The brightness 76 is higher than the brightness 96, because the loudness of the event (e.g. the maximum loudness of the segment corresponding to this event) at moment 86 is higher in song 71 than in song 91.

The brightness value 76 corresponding to the current moment 86 in song 71 is rendered on lighting device 11 as part of light effect 78. Similarly, the brightness value 96 corresponding to the current moment 86 in song 91 is rendered on lighting device 11 as part of light effect 98. Although it would be possible to use the same brightness value 76 or 96 for all pixels of multi pixel lighting device 13, a better user experience may be obtained by only modifying the brightness of one edge pixel of the lighting device 13 per event. The other edge pixel then continues to render the brightness value corresponding to the previous event. Intermediate pixels may render brightness values interpolated from the two edge pixel brightness values.

In the examples of FIG. 3, the brightness value 76 corresponding to the event at moment 86 in song 71 is rendered on the rightmost pixel of lighting device 13 and the brightness value 75 corresponding to the previous event is rendered on the leftmost pixel of lighting device 13. Furthermore, the brightness value 96 corresponding to the event at moment 86 in song 91 is rendered on the rightmost pixel of lighting device 13 and the brightness value 95 corresponding to the previous event is rendered on the leftmost pixel of lighting device 13

In the example of FIG. 3, a main color is used as light effect parameter for at least the single pixel lighting device 11. The main color may be determined based on an audio characteristic of the audio content. Alternatively, the main color and/or a color palette from which the main color is selected may be specified by a user or determined automatically based on album art, for example. The main color may be a local light effect parameter for only the single pixel lighting devices or may be a global light effect parameter. A main color 83 is rendered on lighting device 11 as part of light effect 78 for song 71. A main color 88 is rendered on lighting device 11 as part of light effect 98 for song 91.

The local light effect parameter values for the multi pixel lighting devices specify the way how colors from a color palette are distributed across the pixels. In the examples of FIG. 3, first, a quantity of anchor pixels is determined based on the genre of the audio content. For song 71 with genre pop, three anchor pixels are used: left, center, right. For song 91 with genre classical, two anchor pixels are used: left, right. The colors for the anchor pixels are selected from a color palette. The colors for the other pixels are interpolated from the colors of the anchor pixels. Light control commands transmitted to the multi pixel lighting devices may specify the colors of the anchor pixels or the colors of all pixels.

In the examples of FIG. 3, not only the quantity of anchor points and therefore the quantity of selected colors depends on the genre of the audio content, but also the color palette from which these colors are selected. For song 71 with genre pop, the color palette 72 comprises five colors 81-85 with main color 83 as center. For song 91 with genre classical, the color palette 92 comprises three colors 87-89 with main color 88 as center. The color range of color palette 72 is larger than the color range of color palette 92. In other words, the difference between colors 81 and 85 is larger than the difference between colors 87 and 89. The color palettes 72 and 92 may be subsets of larger color palettes, which may be user-defined or determined automatically based on album art, for example.

Thus, in the examples of FIG. 3, the plurality of colors to be rendered on the multi pixel lighting devices is determined based on the genre of the audio content and the second set of light effect parameter values, i.e. the local light effect parameter values, which are used along with the first set of light effect parameter values, i.e. the global light effect parameter values, to determine the light effects for the multi pixel lighting devices include one or more parameter values which are indicative of this plurality of colors.

In the examples of FIG. 3, the way how colors from a color palette are distributed across the pixels has been determined based on the genre of the audio content. Alternatively or additionally, the way how colors from a color palette are distributed across the pixels may be determined based on the level of dynamicity of the content.

Figure 4:
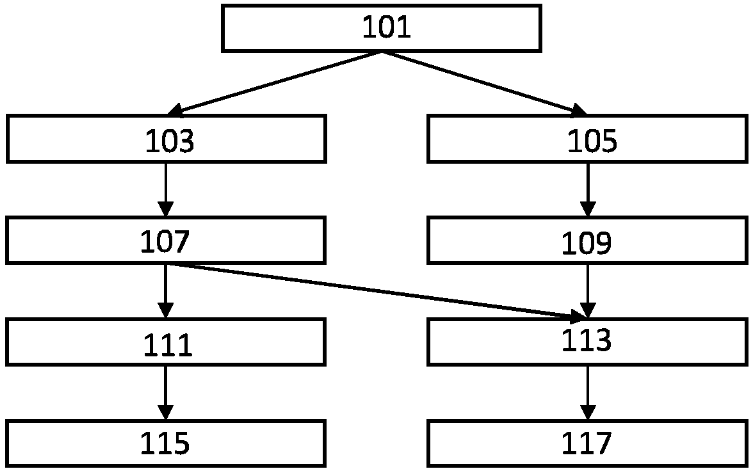
FIG. 4 is a flow diagram of a first embodiment of the method.

A first embodiment of the method of controlling a plurality of lighting devices to render light effects while an audio rendering system renders audio content is shown in FIG. 4. The method may be performed by the (cloud) computer 1 of FIG. 1 or the mobile device 51 of FIG. 2, for example.

A step 101 comprises selecting a first subset and a second subset from a plurality of lighting devices based on a type of each of the plurality of lighting devices. The second subset is different from the first subset. The type of each of the plurality of lighting devices may comprise, for example, one or more of: floor standing, table, ceiling, light strip, spot, wall-mount, white with fixed color temperature, tunable white, color, single pixel, and multi pixel.

Steps 103 and 105 are performed after step 101. Step 103 comprises obtaining one or more first audio characteristics of the audio content. The audio characteristics may be received or analyzed in step 103 or may be obtained from previously obtained audio characteristics. Audio characteristics may be received from a music streaming service, e.g. from an Internet server or local music player application, or may be retrieved from an independent music database based on an identified song, for example. The metadata received from the music streaming service or music database may include, for example, audio characteristics for the following audio features:

Genre
Mood related data (danceability, valence, energy, tempo, musical key)
Loudness
Vocal/instrumental
Beats
Tempo
Sections (chorus, verse, bridge)
Pitch
Timbre
Type of instrument Alternatively, the audio characteristics may be extracted from the audio content (either captured via microphone or by accessing the content file directly) through digital signal processing. Audio analysis can run on cloud-infrastructure or an end-device such as a smartphone, an HDMI module (e.g. a Hue Sync box), or any other connected device. Such audio signal analysis of frequencies and amplitudes of sound waves may be used to extract similar music characteristics as listed above.

It should be noted that "beat" is in general not well-defined. If a musical piece has a tempo of 120 BPM, then this has a direct relation to the duration of notes (quarter notes, eighth notes etc.). However, in the colloquial usage of the word 'beat', the perceived beat of that same song, from the viewpoint of a listener, could very well be 60 BPM, or even 30 BPM. Wikipedia mentions this in the following text: "The beat is often defined as the rhythm listeners would tap their toes to when listening to a piece of music, or the numbers a musician counts while performing, though in practice this may be technically incorrect (often the first multiple level). In popular use, beat can refer to a variety of related concepts, including pulse, tempo, meter, specific rhythms, and groove".

In step 103, the audio characteristics are obtained that are considered for global light control. With global light control, control of all lighting devices of the plurality of lighting devices is meant, resulting in a global/combined light effect for the plurality of lighting devices. The plurality of lighting devices may be the group of lighting devices that the user selected to sync with the music (e.g. a living room or entertainment area).

After step 103, step 107 comprises determining a first set of light effect parameter values based on the one or more first audio characteristics obtained in step 103. Each lighting device of the first subset might still render for example a different color, but the behavior is orchestrated and based on the same set of audio characteristics.

Step 105 comprises obtaining, based on the one or more types of the lighting devices in the second subset, one or more second audio characteristics of the audio content, the one or more second audio characteristics being different from the one or more first audio characteristics. In step 105, the audio characteristics are obtained that are considered for local light control. With local light control, control of a specific subset of lighting devices is meant, e.g. multi-pixel lighting devices, resulting in dedicated light effects for these lighting devices.

After step 105, step 109 comprises determining a second set of light effect parameter values based on the one or more second audio characteristics obtained in step 105. Each lighting device of the second subset might still render for example a different color, but the behavior is orchestrated and based on the same set of audio characteristics.

In an example, mood related data and tempo are selected as audio features for global light control and pitch (i.e. perceived height of the sound) is selected as audio feature for local light control of pixelated lighting devices. An example of meta-data for global audio features is given below. Such data could be available on the level of a playlist, a song, or a segment of a song. In this example, the global audio features are on the level of the song.

```
{
  "audio__characteristics__global": [
    {
"mood" : [
      {
      "energy": 0.626,
      "key": 7,
      "valence": 0.369
      }
]
"tempo": 115.7,
}
]
}
```

For the mood parameters, a mapping may be made where the brightness (dim level) of the lighting device is a function of the "energy" feature value. Assuming that all lighting devices are able to render color, the "key" of the song determines the color palette from which a color is (e.g. randomly) selected for rendering by the lighting devices. The tempo parameter, which is for example expressed in beats per minute, may define the speed of transitions from one color to another color in the color palette.

An example of meta-data for local audio features is given below. In this example, the local audio features apply to a specific segment within in a song.

```
{
"audio__characteristics__local: [
  {
    "pitch": [
      0.709,
      0.092,
      0.134,
      0.17
    ]
  }
]
}
```

For the pitch parameters, a mapping may be made where lower pitch/frequencies are mapped to the first pixels of the pixelated lighting device (e.g. left or bottom), while the higher frequencies are mapped to the last pixels of the pixelated lighting device (e.g. right, top). Each pitch could for example be mapped to a specific color value.

A developer of a software application that controls lighting devices based on audio characteristics may apply design rules to map audio features to light effect parameter values. Alternatively, this mapping may be determined by a user of the software application. The user of the software application may be a professional lighting designer who uses their lighting design expertise or an end-user. For example, the user may be able to select a number of audio features from a list to include in or exclude from global lighting control.

The user would typically take into account properties of the lighting devices in the room, including for example location, archetype (floor standing, ceiling, strip, bulb, etc.), color rendering capabilities (white, color tuneable white, color), functional/decorative application, etc. For a mapping to light effect parameter values for a multi pixel (pixelated) lighting device, the properties of the individual multi pixel lighting device(s) may be taken into account, including the number of pixels and orientation of the luminaire. Additionally or alternatively, the intensity (subtle vs intense) and color palette settings may define the selection of local and global features.

Steps 103 and 107 and steps 105 and 109 may be performed (partly) in parallel or in sequence. For example, these steps may be performed in the sequence 103, 105, 107, 109 or the sequence 103, 107, 105, 109.

Steps 111 and 113 are performed after steps 107 and 109 have been performed. Step 111 comprises determining first light effects with the first set of light effect parameter values determined in step 107. Step 113 comprises determining second light effects with the first set of light effect parameter values determined in step 107 and the second set of light effect parameter values determined in step 109.

A step 115 comprises controlling the first subset of lighting devices to render the first light effects determined in step 111 while the audio rendering system renders the audio content. A step 117 comprises controlling the second subset of lighting devices to render the second light effects determined in step 113 while the audio rendering system renders the audio content. Typically, different control commands will be used to control the first subset of lighting devices than the second subset of lighting devices. However, it may be possible to transmit control commands specifying the first set of light parameter values to both the first subset and the second subset and transmit control commands specifying only the second set of light parameter values to the second subset.

The determined light effects may first be specified in a light script and the lighting devices may then be controlled when the light script is executed. The light script may executed immediately or at a later moment. The first set of light effect parameter values and the second set of light effect parameter values may be stored as separate layers in the light script, thereby making it is easy for content creators to tweak the light script.

Figure 5:
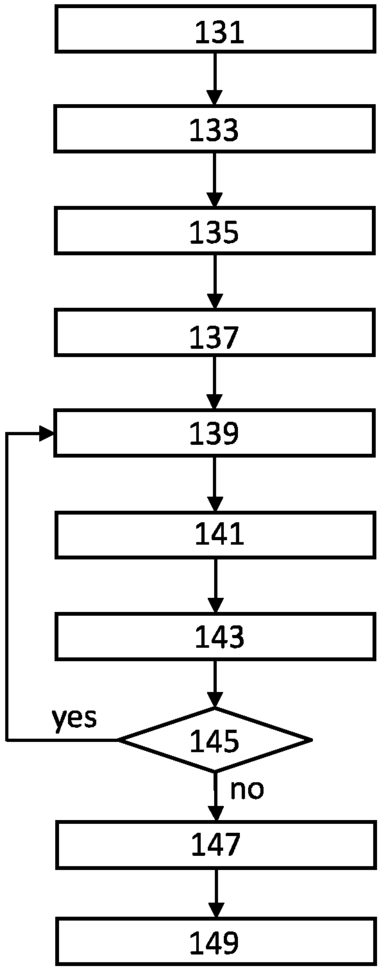
FIG. 5 is a flow diagram of a second embodiment of the method.

A second embodiment of the method of controlling a plurality of lighting devices to render light effects while an audio rendering system renders audio content is shown in FIG. 5. The method may be performed by the (cloud) computer 1 of FIG. 1 or the mobile device 51 of FIG. 2, for example. A step 131 comprises determining at least two subsets of lighting devices from a plurality of lighting devices based on a type of each of the plurality of lighting devices. Each of the subsets is different. Each of the plurality of lighting devices is part of one subset.

Optionally, single pixel lighting devices located close to each other may be grouped and treated as a virtual multi pixel (pixelated) lighting device. In this case, this group of single pixel lighting devices may be included in the subset of multi pixel lighting devices. This may be beneficial if the light setup has too many lighting devices. Each of the single pixel lighting devices is mapped to a position on the virtual multi pixel lighting device, e.g. based on the relative locations of the single pixel lighting devices with respect to each other.

A step 133 comprises selecting from the subsets the subset with the least capabilities, e.g. comprising lighting devices with only a single pixel which only renders white light. A step 135 comprises obtaining one or more audio characteristics of the audio content based on the capabilities of the subset selected in step 133. A step 137 comprises determining a set of global light effect parameter values based on the one or more audio characteristics obtained in step 135. All lighting devices of the plurality of lighting devices will render light effects with these light effect parameter values.

An example of a global light effect parameter is brightness, which may be determined based on maximum loudness (in segment) and/or loudness difference (between start and end of segment). If all lighting devices are able to render color, then color may also be a global light effect parameter. A color palette from which the color(s) to be rendered is/are selected may be determined based on valence and/or energy, for example.

In the first iteration of a step 139, a first subset of the subsets determined in step 131 is selected. This may be the subset selected in step 133 or the first other subset, for example. A step 141 comprises obtaining, based on the one or more types of the lighting devices in the subset selected in step 139, one or more audio characteristics of the audio content based on the capabilities of the subset selected in step 139. At least one, and possibly all, of these audio characteristics is different from the one or more audio characteristics based on which the set of global light effect parameter values was determined in step 137 and from the one or more audio characteristics selected for another subset in a previous iteration of step 141. A step 143 comprises determining a set of local light effect parameter values based on the one or more audio characteristics obtained in step 141.

A first example of a local light effect parameter for a multi pixel lighting device is a parameter which specifies the way how colors from the palette are distributed across the pixels. The value of this parameter may be determined based on the pitch, the timbre, or the genre of the audio content, for example. A second example of a local light effect parameter for a multi pixel lighting device is a parameter which specifies a specific effect, like for example chasing lights. The type of the specific effect and how it rendered may be determined based on the pitch, the timbre, or the genre of the audio content, for example.

Optionally, a local light effect parameter may be used for single pixel lighting devices. An example of such a local light effect parameter is the envelope of the light effect, e.g. how quickly brightness goes up and how slowly it goes down. The value of this parameter may be determined based on the pitch, the timbre, or the genre of the audio content, for example. This adaptation would not change the brightness in relation to the lowest and the highest brightness, but changes how the light reach these points.

A step 145 comprises checking whether local light effect parameter values have been determined for all of the subsets determined in step 131, except perhaps for the subset with the least capabilities selected in step 133. Optionally, local light effects parameter values are also determined for the subset with the least capabilities selected in step 133. If local light effect parameter values have been determined for all of the subsets determined in step 131, then a step 147 is performed next. If not, the next subset of the subsets determined in step 131 is selected in the next iteration of step 139, and the method then proceeds as shown in FIG. 5.

Step 147 comprises determining light effects for each lighting device with, for each lighting device, the global light effect parameter values and, for lighting devices of at least one of the subsets, the local light effects parameter values of the corresponding subset. Step 149 comprises controlling the lighting devices to render the light effects determined for them in step 147 while the audio rendering system renders the audio content. If light effect parameter values are first stored in a light script, the global light effect parameter values may be stored in a global layer and the local light effect parameter values may be stored in one or more local layers. For example, there may be a local layer per subset of lighting devices.

Figure 6:
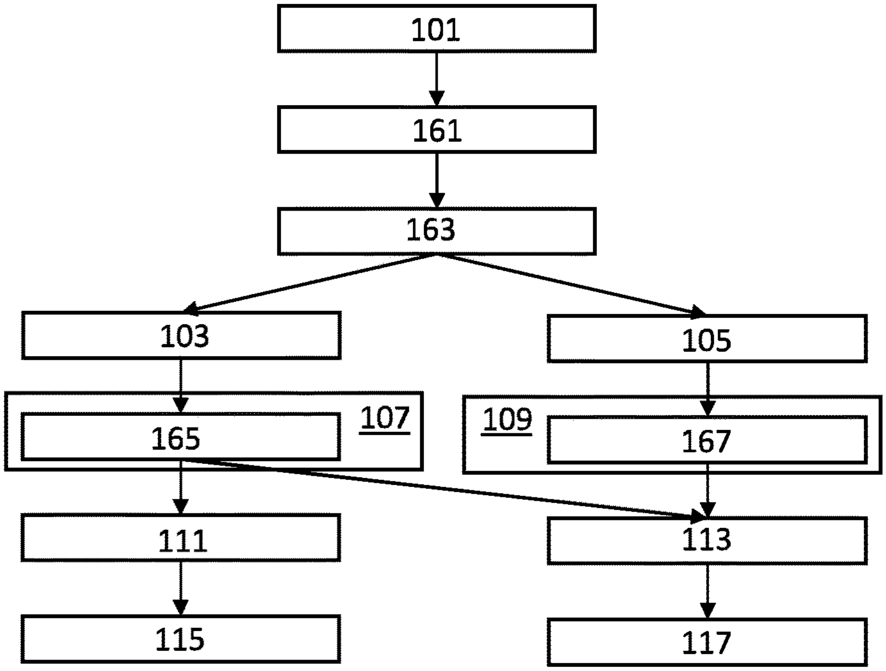
FIG. 6 is a flow diagram of a third embodiment of the method.

A third embodiment of the method of controlling a plurality of lighting devices to render light effects while an audio rendering system renders audio content is shown in FIG. 6. The embodiment of FIG. 6 is an extension of the embodiment of FIG. 4. In the embodiment of FIG. 6, steps 161 and 163 are performed between step 101 and steps 103 and 105, and steps 107 and 109 are implemented by steps 165 and 167, respectively.

Step 161 comprises obtaining audio characteristics of the audio content. Audio characteristics may then be obtained from these audio characteristics in steps 103 and 105. Step 163 comprises determining events in the audio content based on the audio characteristics obtained in step 161. The events correspond to moments in the audio content when the audio characteristics meet predefined requirements, e.g. where the loudness exceeds a threshold and/or a note is being played.

Step 165 comprises determining a first set of light effect parameter values based on the one or more first audio characteristics obtained in step 103 for the events determined in step 163. Step 167 comprises determining a second set of light effect parameter values based on the one or more second audio characteristics obtained in step 105 for the events determined in step 163.

Figure 7:
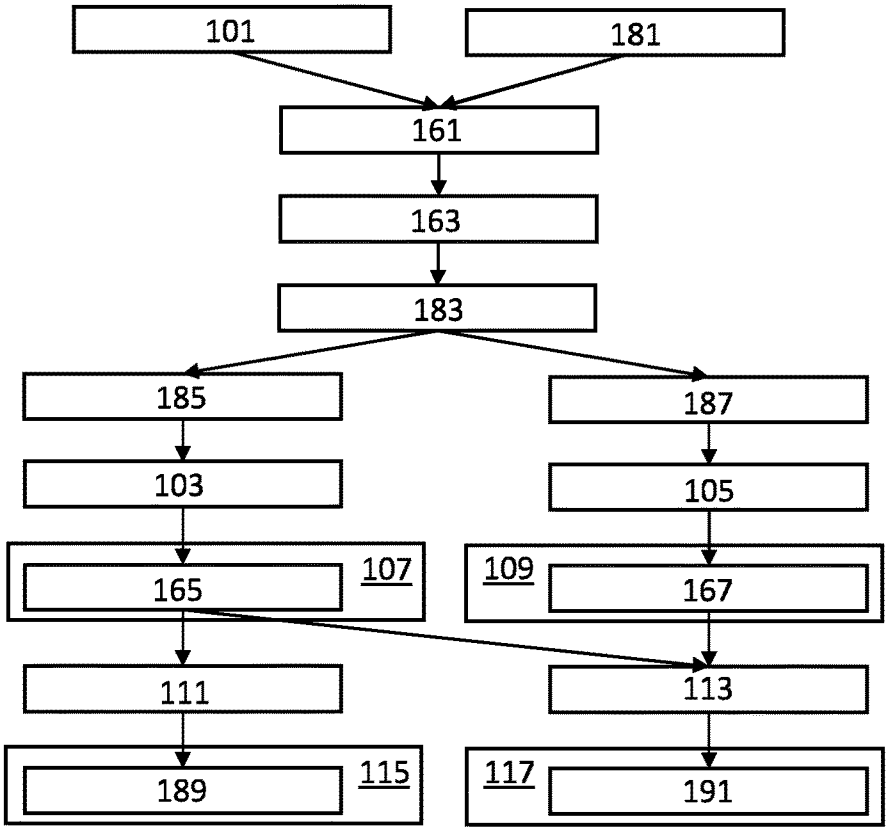
FIG. 7 is a flow diagram of a fourth embodiment of the method.

A fourth embodiment of the method of controlling a plurality of lighting devices to render light effects while an audio rendering system renders audio content is shown in FIG. 7. The embodiment of FIG. 7 is an extension of the embodiment of FIG. 6. In the embodiment of FIG. 7, location information of the lighting devices and location information associated with the audio content is taken to account to determine how and where to render the global and local light effects. Optionally, location information of the speakers is also taken into account.

In the embodiment of FIG. 7, a step 181 is performed before step 161, steps 183, 185, and 187 are performed between step 161 and steps 103 and 105, and steps 115 and 117 are implemented by steps 189 and 191, respectively.

Step 181 comprises obtaining location information indicative of locations of the plurality of lighting devices. Step 183 comprises determining audio source positions associated with the events determined in step 163. Step 185 comprises selecting, for each of the events determined in step 163, one or more first lighting devices from the first subset based on the audio source positions determined in step 183 and the locations of the lighting devices of the first subset, as indicated in the location information obtained in step 181.

Step 187 comprises selecting, for each of the events determined in step 163, one or more second lighting devices from the second subset based on the audio source positions determined in step 183 and the locations of the lighting devices of the second subset, as indicated in the location information obtained in step 181.

Step 189 comprises controlling, for each of the events determined in step 163, the one or more first lighting devices selected in step 185 for this event to render the light effect(s) determined for this event in step 165 while the audio rendering system renders the audio content. Step 191 comprises controlling, for each of the events determined in step 163, the one or more second lighting devices selected in step 187 for this event to render the light effect(s) determined for this event in step 167 while the audio rendering system renders the audio content.

In the embodiment of FIG. 7, the lighting device(s) on which a light effect determined for a certain event is rendered depends on the locations of the lighting devices but the light effect itself does not depend on the locations of the lighting devices. In an alternative embodiment, the locations of the lighting devices are additionally or alternatively used to determine the light effects. In this alternative embodiment, alternatives to steps 165 and 167 are used.

The embodiments of FIGS. 6 and 7 have been described as extensions of the embodiment of FIG. 4. However, the embodiment of FIG. 5 may be extended in a similar way.

Figure 8:
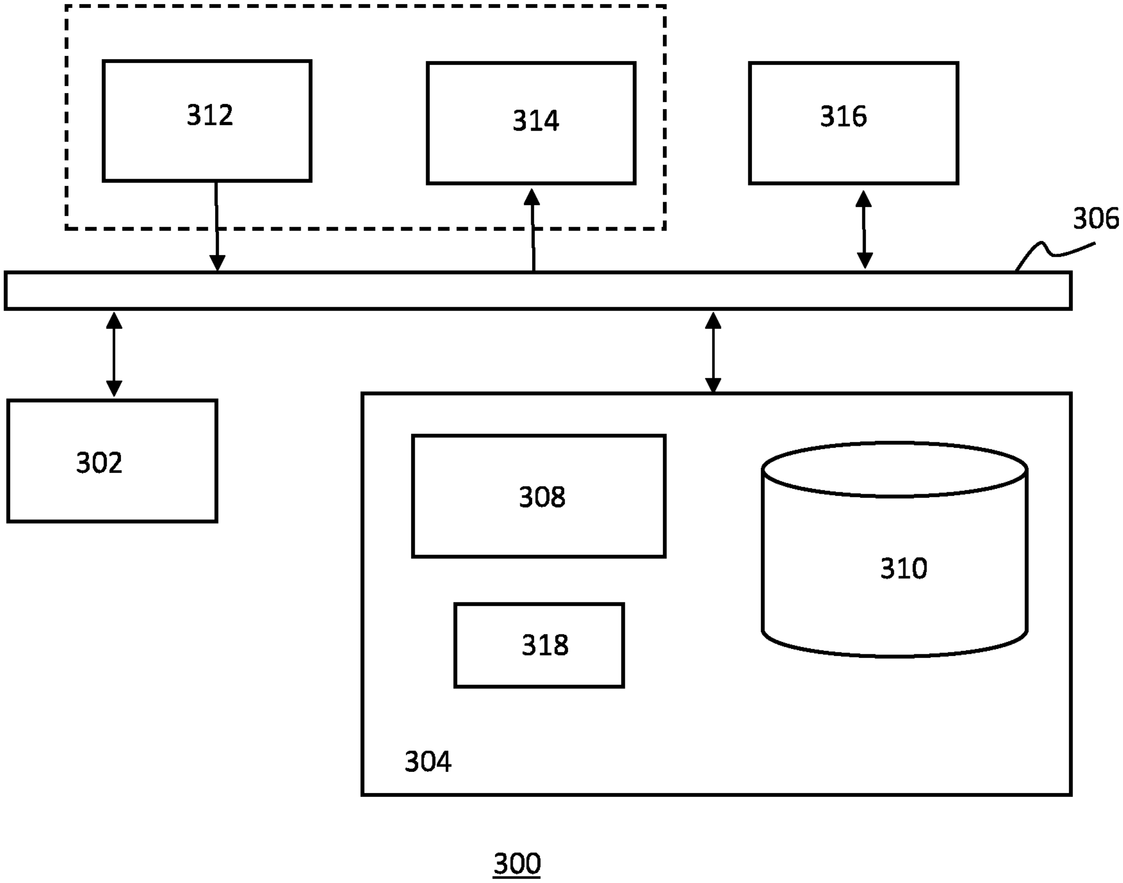
FIG. 8 is a block diagram of an exemplary data processing system for performing the method of the invention.

FIG. 8 depicts a block diagram illustrating an exemplary data processing system that may perform the method as described with reference to FIGS. 4 to 7.

As shown in FIG. 8, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g., if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g., for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 8 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 8, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 8) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for controlling a plurality of lighting devices to render light effects while an audio rendering system renders audio content, said system comprising:

at least one transmitter; and at least one processor configured to:

select a first subset and a second subset from said plurality of lighting devices based on a type of each of said plurality of lighting devices, said second subset being different from said first subset, said second subset having one or more lighting devices with one or more capabilities that the lighting devices in said first subset do not have, obtain one or more first audio characteristics of said audio content, obtain, based on one or more types of said lighting devices in said second subset, one or more second audio characteristics of said audio content, said one or more second audio characteristics being different from said one or more first audio characteristics, determine a first set of light effect parameter values based on said one or more first audio characteristics, determine a second set of light effect parameter values based on said one or more second audio characteristics, said lighting devices in said first subset not being capable of rendering light effects with said second set of light effect parameter values, determine first light effects with said first set of light effect parameter values, said first light effects not being determined with said second set of light effect parameter values, determine second light effects with said first set of light effect parameter values and said second set of light effect parameter values, control, via said at least one transmitter, said first subset of lighting devices to render said first light effects while said audio rendering system renders said audio content, and control, via said at least one transmitter, said second subset of lighting devices to render said second light effects while said audio rendering system renders said audio content.

2. The system as claimed in claim 1, wherein said at least one processor is configured to:

determine events in said audio content based on said one or more first audio characteristics, said one or more second audio characteristics, and/or one or more further audio characteristics of said audio content, said events corresponding to moments in said audio content when said audio characteristics meet predefined requirements, and determine said first light effects and said second light effects for said events.

3. The system as claimed in claim 2, wherein said at least one processor is configured to:

obtain location information indicative of locations of said plurality of lighting devices, determine one or more audio source positions associated with an event of said events, select one or more first lighting devices from said first subset based on said one or more audio source positions and said locations of said lighting devices of said first subset, select one or more second lighting devices from said second subset based on said one or more audio source positions and said locations of said lighting devices of said second subset, control said one or more first lighting devices to render a first light effect of said first light effects and said one or more second lighting devices to render a second light effect of said second light effects, said first light effect and said second light effect being determined for said event.

4. The system as claimed in claim 1, wherein said at least one processor is configured to obtain said one or more first audio characteristics and said one or more second audio characteristics by receiving metadata describing at least some of said one or more first audio characteristics and said one or more second audio characteristics and/or to receive said audio content and analyze said audio content to determine at least some of said one or more first audio characteristics and said one or more second audio characteristics.

5. The system as claimed in claim 1, wherein said one or more first audio characteristics comprise at least one of loudness and energy and/or said first set of light effect parameter values comprises brightness values.

6. The system as claimed in claim 1, wherein said one or more second audio characteristics comprise a dynamicity level of said audio content and/or a genre of said audio content, said second subset of said plurality of lighting devices comprises only multi pixel lighting devices, and said at least one processor is configured to determine a plurality of colors to be rendered on said multi pixel lighting devices based on said dynamicity level and/or said genre and include in said second set of light effect parameter values one or more parameter values indicative of said plurality of colors.

7. The system as claimed in claim 1, wherein said one or more first audio characteristics comprises a duration of a beat in said audio content and said at least one processor is configured to determine, based on said duration of said beat, a duration of a light effect to be rendered during said beat, said duration of said light effect being one of said first set of light effect parameter values.

8. The system as claimed in claim 1, wherein said one or more first audio characteristics comprises tempo and said at least processor is configured to determine a speed of transitions between light effects based on said tempo, one or more parameter values of said first set of light effect parameter values being indicative of said speed of transitions between light effects.

9. The system as claimed in claim 1, wherein said one or more first audio characteristics and/or said one or more second audio characteristics comprise at least one of valence, key, timbre, and pitch and said at least one processor is configured to determine a color, a color temperature, or a color palette based on said valence, said key, said timbre, and/or said pitch and include in said first set and/or said second set of light effect parameter values one or more parameter values indicative of said color, said color temperature, or one or more colors selected from said color palette.

10. The system as claimed in claim 1, wherein said at least one processor is configured to:

select a third subset from said plurality of lighting devices based on said type of each of said plurality of lighting devices, said third subset being different from said first subset, obtain, based on said one or more types of said lighting devices in said third subset, one or more third audio characteristics of said audio content, said one or more third audio characteristics being different from said one or more first audio characteristics and said one or more second audio characteristics, determine a third set of light effect parameter values based on said one or more third audio characteristics, determine third light effects with said first set of light effect parameter values and said third set of light effect parameter values, and control, via said at least one transmitter, said third subset of lighting devices to render said third light effects while said audio rendering system renders said audio content.

11. The system as claimed in claim 10, wherein said second subset and said third subset are different.

12. An arrangement comprising the system as claimed in claim 1 and the plurality of lighting devices.

13. The system as claimed in claim 1, wherein said at least one processor is configured to determine a color palette automatically based on album art associated with said audio content, and to select one or more colors from said color palette for inclusion in said second set of light effect parameter values.

14. The system as claimed in claim 1, wherein said at least one processor is configured to generate a light script comprising a global layer that stores said first set of light effect parameter values and a local layer that stores said second set of light effect parameter values, and to control said first subset and said second subset of lighting devices by executing said light script in synchronization with rendering of said audio content by said audio rendering system.

15. The system as claimed in claim 1, wherein said at least one processor is configured to determine, based on at least one of pitch, timbre, and genre of said audio content, an envelope of a light effect that specifies how quickly a brightness of said light effect increases and how slowly said brightness decreases, and to include one or more parameter values indicative of said envelope in said second set of light effect parameter values.

16. A method of controlling a plurality of lighting devices to render light effects while an audio rendering system renders audio content, said method comprising:

selecting a first subset and a second subset from said plurality of lighting devices based on a type of each of said plurality of lighting devices, said second subset being different from said first subset, said second subset having one or more lighting devices with one or more capabilities that the lighting devices in said first subset do not have;

obtaining one or more first audio characteristics of said audio content;

obtaining, based on one or more types of said lighting devices in said second subset, one or more second audio characteristics of said audio content, said one or more second audio characteristics being different from said one or more first audio characteristics;

determining a first set of light effect parameter values based on said one or more first audio characteristics;

determining a second set of light effect parameter values based on said one or more second audio characteristics, the lighting devices in said first subset not being capable of rendering light effects with said second set of light effect parameter values;

determining first light effects with said first set of light effect parameter values, said first light effects not being determined with said second set of light effect parameter values;

determining second light effects with said first set of light effect parameter values and said second set of light effect parameter values;

controlling said first subset of lighting devices to render said first light effects while said audio rendering system renders said audio content; and controlling said second subset of lighting devices to render said second light effects while said audio rendering system renders said audio content.

17. A non-transitory computer-readable storage device with computer program code stored thereon to perform the method of claim 16 when run on a processor.

* * * * *